(12) United States Patent  (10) Patent No.: US 8,375,191 B2
Kim  (45) Date of Patent: Feb. 12, 2013

(54) NON-VOLATILE MEMORY, PAGE DYNAMIC ALLOCATION APPARATUS AND PAGE MAPPING APPARATUS THEREFOR, AND PAGE DYNAMIC ALLOCATION METHOD AND PAGE MAPPING METHOD THEREFOR

(75) Inventor: Min-chan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 12/637,836

(22) Filed: Dec. 15, 2009

(65) Prior Publication Data

US 2010/0174860 A1    Jul. 8, 2010

(30) Foreign Application Priority Data

Jan. 7, 2009 (KR) .................. 10-2009-0001305

(51) Int. Cl.
*G06F 12/02* (2006.01)
(52) U.S. Cl. ........................................ 711/170
(58) Field of Classification Search ........ None
See application file for complete search history.

(56) References Cited

U.S. PATENT DOCUMENTS

| | | | |
|---|---|---|---|
| 6,910,106 B2 | 6/2005 | Sechrest et al. | |
| 7,185,155 B2 | 2/2007 | Sechrest et al. | |
| 7,457,910 B2 | 11/2008 | Chang et al. | |
| 2003/0073497 A1* | 4/2003 | Nelson | 463/42 |
| 2005/0246487 A1 | 11/2005 | Ergan et al. | |
| 2006/0004977 A1 | 1/2006 | Jann et al. | |
| 2007/0118712 A1* | 5/2007 | van Riel et al. | 711/170 |
| 2007/0180215 A1* | 8/2007 | Cascaval et al. | 711/202 |
| 2008/0195803 A1 | 8/2008 | Park et al. | |
| 2010/0058046 A1* | 3/2010 | John et al. | 713/2 |

FOREIGN PATENT DOCUMENTS

| | | |
|---|---|---|
| KR | 1020040031645 | 4/2004 |
| KR | 1020060047704 | 5/2006 |
| KR | 1020060091358 | 8/2006 |
| KR | 1020070024552 | 3/2007 |
| KR | 1020080025178 | 3/2008 |
| KR | 1020080075608 | 8/2008 |

* cited by examiner

*Primary Examiner* — Duc Doan
(74) *Attorney, Agent, or Firm* — NSIP Law (57) ABSTRACT

Disclosed are a non-volatile memory and page dynamic allocation and mapping technology thereof. According to the page dynamic allocation and mapping technology, by variable memory allocation, fragmentation may be prevented and page faults may be minimized in response to pages being loaded through page mapping of the non-volatile memory.

18 Claims, 7 Drawing Sheets

NON-VOLATILE MEMORY, PAGE DYNAMIC ALLOCATION APPARATUS AND PAGE MAPPING APPARATUS THEREFOR, AND PAGE DYNAMIC ALLOCATION METHOD AND PAGE MAPPING METHOD THEREFOR

CROSS-REFERENCE TO RELATED APPLICATION

This application claims the benefit under 35 U.S.C. §119(a) of a Korean Patent Application No. 10-2009-0001305, filed Jan. 7, 2009, the disclosure of which is incorporated herein by reference in its entirety for all purposes.

BACKGROUND

1. Field

The following description relates to management of a memory, and more particularly, to technology related to dynamically allocating and mapping pages in a non-volatile memory.

2. Description of the Related Art

Recent development of conventional computer systems includes a two-level storage structure having a volatile memory such as a Random Access Memory (RAM) to store short-term data (for example, Stacks and Heaps), and a non-volatile memory such as a Hard Disk Drive (HDD) to store long-term data (for example, data pages). Accordingly, various operating systems (OS) have been optimized to be compatible with such a two-level storage structure.

However, in an OS optimized to be compatible with the two-level storage system, memory fragmentation within the storage system can occur. That is, pages used by application programs may become scattered in the storage system where use of the computer system is prolonged.

Also, an OS optimized to be compatible with a two-level storage computer system utilizes a demand-paging policy, and accordingly page faults frequently occur.

In order to load pages through demand-paging, context switching is needed. Page faults may occur sometimes where pages are loaded from a non-volatile memory to a volatile memory. Accordingly, the conventional two-level storage system may suffer from performance deterioration due to such memory fragmentation and page faults.

Recently, studies regarding non-volatile memories, such as Non-Volatile RAMs (NVRAM) including PRAMs, MRAMs, FeRAMs, and the like, have been actively undertaken in the related technical fields. Non-volatile memories such as NVRAMs are believed to have certain benefits including being accessed in units of bytes and achieving simple deletion calculations and low power consumption.

SUMMARY

In one general aspect, there is provided a non-volatile memory including a fixed region to store an operating system (OS) and pages used by the OS, a first variable region to store application programs and pages used by the application programs, and a second variable region to store easily-retrievable pages, wherein a size of the second variable region increases or decreases in correspondence to a variation in a size of the first variable region.

In the first variable region, pages sharing a common attribute corresponding to each application program may divided in units of a page size representable by the OS, and may be positioned in successive spaces corresponding to each segment.

The first variable region may include a metadata area to store physical start address information and size information of pages associated with each application program.

The easily-retrievable pages stored in the second variable region may be read-only pages duplicated from and synchronized with original pages, or pages synchronized with data stored in a HDD so as to more quickly access the OS.

In another general aspect, there is provided an apparatus to dynamically allocate pages in a non-volatile memory, the non-volatile memory including a fixed region to store an operating system (OS) and pages used by the OS, a first variable region to store application programs and pages used by the application programs, and a second variable region to store easily-retrievable pages, wherein a size of the second variable region increases or decreases in correspondence to a variation in size of the first variable region, the apparatus including a remaining space checking unit to check whether enough space to perform page allocation remains in the first variable region, according to a page allocation call request from an application program, and a page dynamic allocation unit to obtain space needed from the second variable region of the non-volatile memory when there is not enough space to perform the page allocation in the first variable region, to add the obtained space to the first variable region and to allocate the pages to the first variable region in correspondence to the page allocation call request.

In another general aspect, there is provided an apparatus to map pages in a non-volatile memory, including a mapping controller to perform page mapping control corresponding to pages stored in the non-volatile memory according to a page mapping call request from an application program, a page determining unit to determine a number of pages to be mapped and report physical addresses of the pages to be mapped to the mapping controller, and a page mapping unit to map the pages to a page table of the application program which has issued the page mapping call request, according to the physical addresses of the pages.

The apparatus may further include an authority determination unit to determine whether the application program which has issued the page mapping call request has access authority corresponding to the pages.

In response the authority determination unit determining that the application program has access authority corresponding to the pages, the mapping controller may perform the page mapping control corresponding to the pages.

The authority determination unit may determine access authority by determining whether a process which is designed to have pages is permitted to have the pages.

The page determination unit may determine a number of pages to be mapped based on a page access pattern.

The page determination unit may determine the number of pages to be mapped based on locality of pages that have been accessed previously.

The page determination unit may determine a number of pages to be mapped according to a capacity of the page table of the application program which has issued the page mapping call request.

In another general aspect, there is provided a method of allocating pages in a non-volatile memory, the non-volatile memory including a fixed region to store an operating system (OS) and pages used by the OS, a first variable region to store application programs and pages used by the application programs, and a second variable region to store easily-retrievable pages, wherein a size of the second variable region increases or decreases in correspondence to a variation in a size of the first variable region, the method including receiving a page allocation call request from an application program, checking whether enough space corresponding to page allocation remains in the first variable region, according to the page allocation call request, in response to there is being enough space to perform page allocation in the first variable region, obtaining space needed from the second variable region of the non-volatile memory, and adding the obtained space to the first variable region, and allocating the pages to the first variable region in correspondence to the page allocation call request.

In another general aspect, there is provided a method of mapping pages in a non-volatile memory, including receiving a page mapping call request from an application program, determining a number of pages to be mapped according to the page mapping call request, detecting physical addresses of the pages to be mapped, and mapping the pages to a page table of the application program which has issued the page mapping call request, according to the physical addresses of the pages.

The determining of the number of pages to be mapped may include determining whether the application program which has issued the page mapping call request has access authority for the pages, and determining a number of pages to be mapped if the application program has access authority corresponding to the pages.

The determining of the number of pages to be mapped may include determining whether the application program has access authority corresponding to the pages by determining whether the pages to be mapped are occupied by another application program.

The determining of the number of pages to be mapped may include determining the number of pages to be mapped based on a page access pattern.

The determining of the number of pages to be mapped may include determining the number of pages to be mapped based on locality of pages that have been accessed previously.

The determining of the number of pages to be mapped may include determining the number of pages to be mapped according to a capacity of the page table of the application program which has issued the page mapping call request.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses, and/or methods described herein will likely suggest themselves to those of ordinary skill in the art. Also, descriptions of well-known functions and constructions may be omitted for increased clarity and conciseness.

While a conventional two-level storage system includes both a volatile memory such as RAM to store short-term data (for example, stacks, heaps, etc.) and a non-volatile memory such as HDD to store long-term data (for example, data pages, etc.), an exemplary one-level storage system includes a single integrated memory which functions as both a volatile memory and non-volatile memory.

Figure 1:
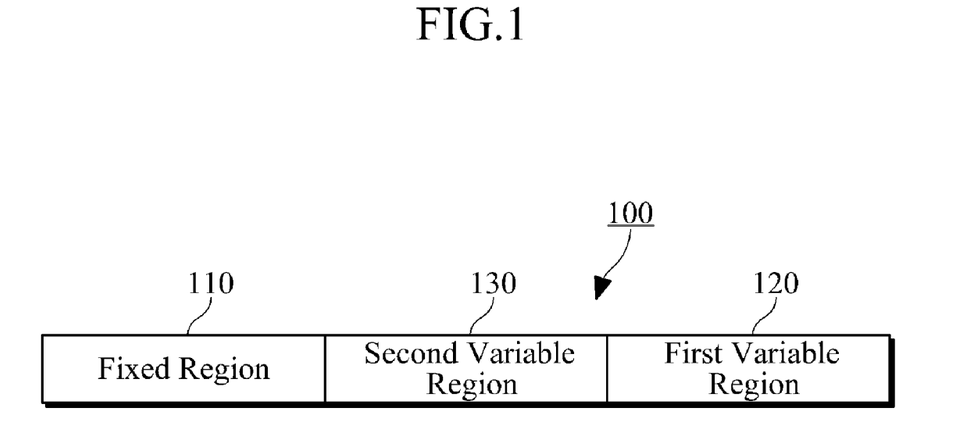
FIG. 1 is a diagram illustrating an exemplary structure of a non-volatile memory.

FIG. 1 illustrates an exemplary structure of a non-volatile memory 100. Referring to FIG. 1, the non-volatile memory 100 includes a fixed region 110, a first variable region 120 and a second variable region 130.

The fixed region 110 stores an operating system (OS) and pages that are used by the OS. That is, the fixed region 110 is assigned to include the OS, and has a fixed size.

The first variable region 120 stores application programs and pages that are used by the application programs Conventionally, since pages of application programs may be scattered around and stored in a memory, memory fragmentation may occur. However, in the exemplary embodiment, since pages corresponding to application programs are assigned to the first variable region 120, such memory fragmentation may be prevented.

Also, the non-volatile memory 100 has a one-level storage structure which integrates a volatile memory with a non-volatile memory. Accordingly, the exemplary non-volatile memory 100, unlike a conventional two-level storage system, maps pages with physically fixed addresses in the first variable region 120 to page tables, instead of newly allocating and duplicating pages, in response to page faults. Accordingly, page loading becomes more efficient. This process will be described in more detail later.

Figure 2:
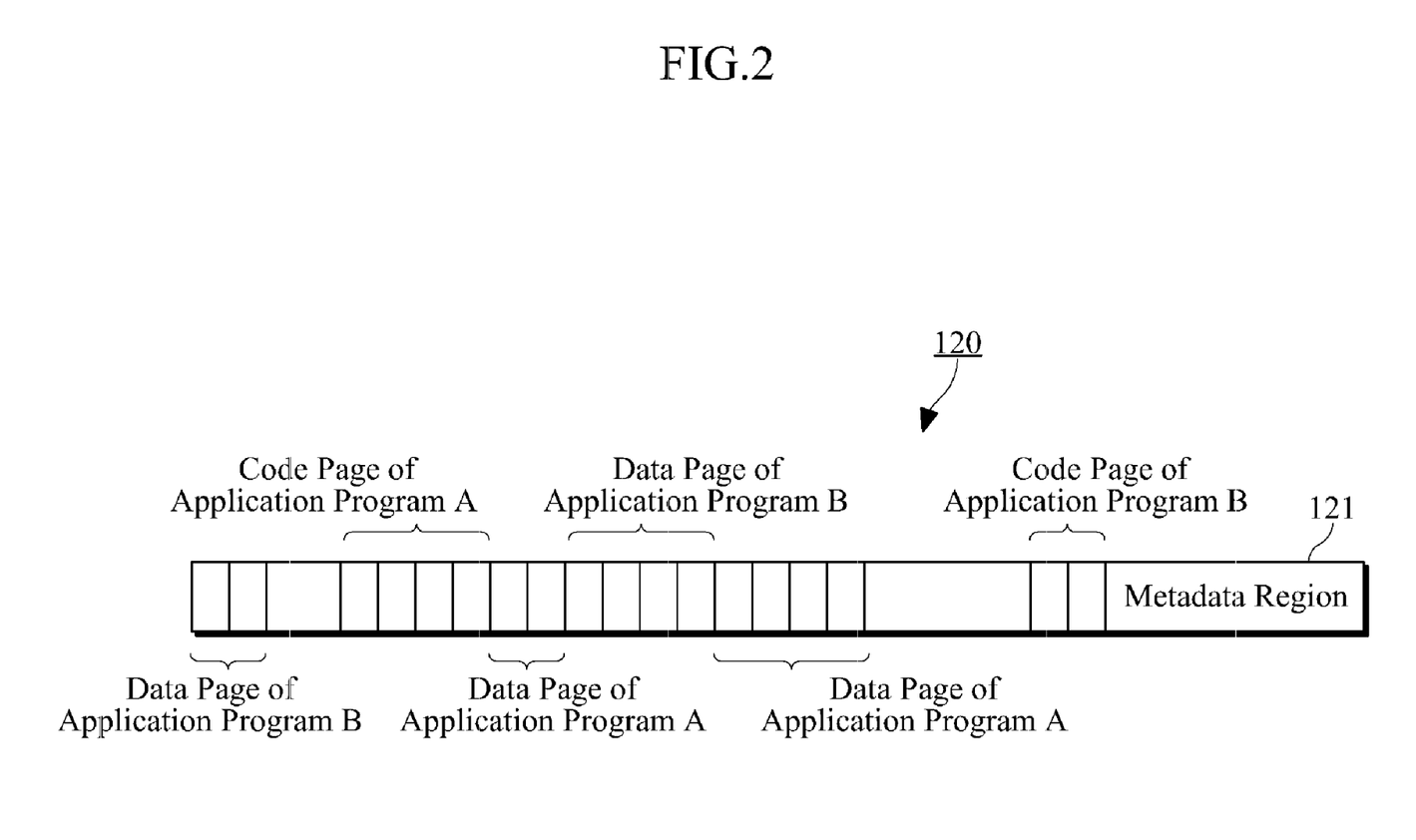
FIG. 2 is a diagram illustrating an exemplary first variable region of a non-volatile memory.

FIG. 2 illustrates an exemplary first variable region of the non-volatile memory 100. As illustrated in FIG. 2, in order to reduce a number of page tables, in the first variable region 120, pages sharing a common attribute corresponding to each application program are divided in units of a page size that can be represented by the OS, and positioned in and managed on successive spaces corresponding to each segment. This process will also be described in more detail later.

The first variable region 120 may include a metadata area 121 to store information about physical start addresses of pages associated with each application program, and information about sizes of the pages. The metadata stored in the metadata area 121 is referenced in response to the pages stored in the first variable region 120 being managed.

The second variable region 130 stores pages that are easily retrievable, and a size of the second variable region 130 increases and/or decreases in correspondence to a change in a size of the first variable region 120. The second variable region 130 is a region to which easily retrievable pages are assigned in order to expand the first variable region 120 in response to an insufficient number of available pages in the first variable region 120.

The easily-retrievable pages stored in the second variable region 130 may be read-only pages which are duplicated from and synchronized with original pages, or pages synchronized with data stored in a HDD to quickly access the OS. For example, the easily-retrievable pages may be pages of a buffer cache.

Since read-only pages duplicated from and synchronized with original pages cannot become corrupted pages, the read-only pages may be discarded after being retrieved, thereby resulting in straight-forward page retrieval.

Meanwhile, in response to corrupted read-write pages being retrieved after all read-only pages duplicated from and synchronized with original pages have been retrieved, it may be preferable to perform a swap-out.

The non-volatile memory 100 is efficient it allows easy retrieval of pages, reduces the number of page tables and can vary the sizes of memory regions.

That is, the non-volatile memory 100 may reduce the number of page tables because pages sharing a common attribute corresponding to each application program may be divided in units of a page size that can be represented by the OS, and positioned in successive spaces of the first variable region corresponding to each segment.

An example of this is given below with reference to FIG. 3 which illustrates a comparison between an exemplary page table of an exemplary non-volatile memory and an exemplary page table of a conventional non-volatile memory.

Figure 3:
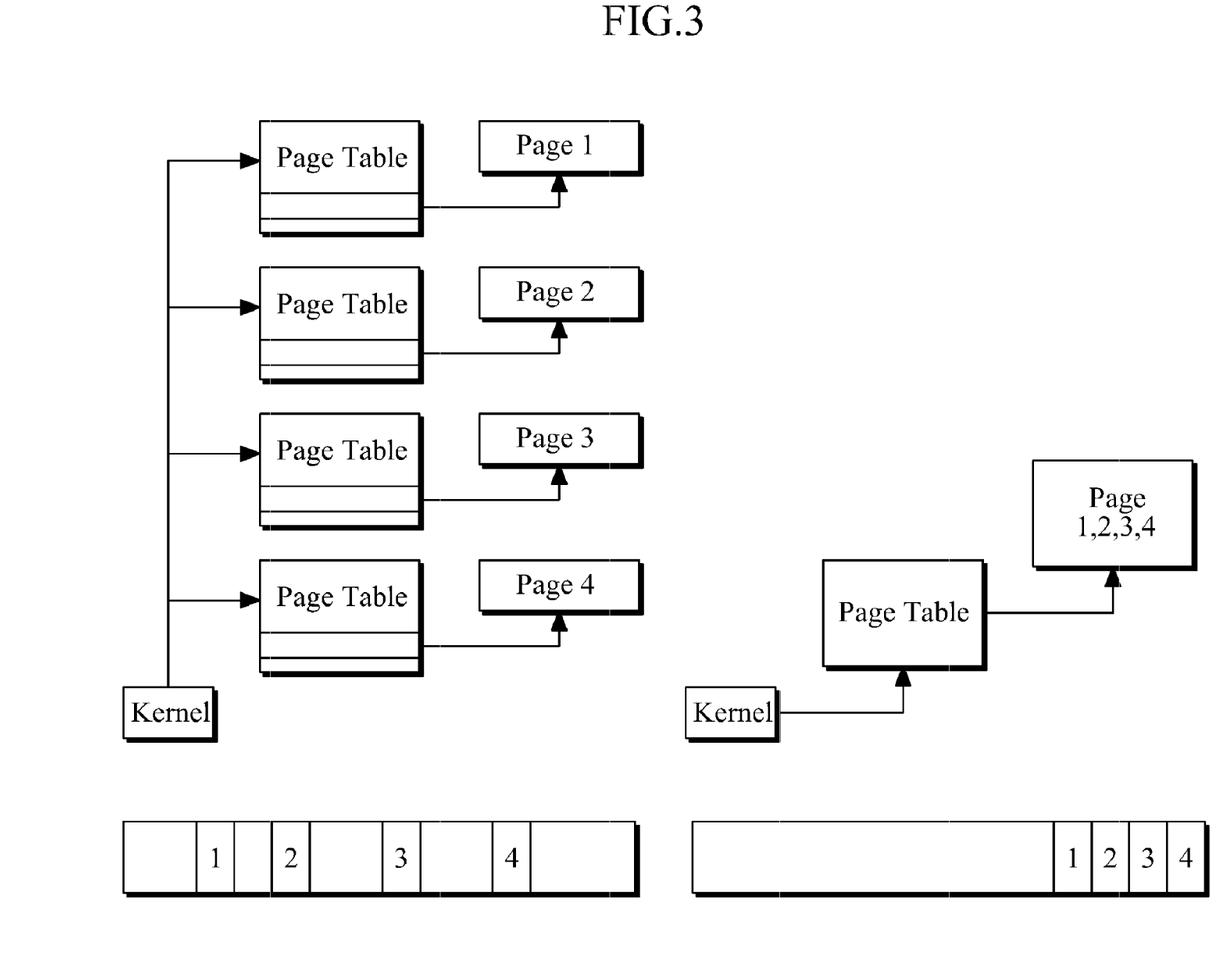
FIG. 3 is a diagram illustrating a comparison between an exemplary page table of an exemplary non-volatile memory and an exemplary page table of a conventional non-volatile memory.

As illustrated in a right portion of FIG. 3, where four code pages of an application program are physically positioned in succession, these four pages may be considered to be a single page having a size corresponding to sizes of the four pages. Accordingly, the single page may be mapped at a single entry of a page table.

Meanwhile, as illustrated in a left portion of FIG. 3, in the conventional memory where code pages of an application program are physically scattered, page tables to which the respective pages are mapped are needed to map the pages.

Pages are mapped with different sizes to page tables, according to specific computer architectures. For example, in an x86 architecture, 4K bytes are needed per page, but in an Advanced RISC Machine (ARM) architecture, successive spaces that reach a size of 16K bytes are needed.

That is, since 16K bytes require four pages each having the size of 4K bytes, a search must be performed to find $2^2$ successive pages. Where more pages are required to be searched, system performance may worsen due to memory fragmentation. In serious cases, Out-Of Memory (OOM) occurs, which may lead to a shut down of an application program.

By varying a size of the first variable region 120, the non-volatile memory 100 can be used more efficiently. Conventionally, a size of a memory is fixed depending on the capacity of a device on which a file system is mounted.

In a conventional non-volatile memory, a large amount of memory is unnecessarily wasted if too much space is reserved, whereas if too little space is reserved, an advantage of using the reserved memory space where main application programs are executed on the non-volatile memory 100 may not be available.

Therefore, in the non-volatile memory 100, by varying the sizes of the first variable region 120 and the second variable region 130 in correspondence to each other, a more efficient use of the non-volatile memory 100 is ensured. That is, where enough storage space does not remain in the first variable region 120 which stores pages of application programs and pages used by the application programs, needed space is obtained by deleting pages from the second variable region 130. Accordingly, the obtained space is inserted into the first variable region 120. Therefore, efficient use of the non-volatile memory 100 is ensured by varying the first variable region 120.

In contrast, where enough space remains in the first variable region 120, the first and second variable regions 120 and 130 may be varied in a manner to decrease the size of the first variable region 120 and increase the size of the second variable region 130.

Accordingly, since the non-volatile memory 100 is optimized to be compatible with a one-level storage system, fragmentation and page faults that commonly occur in a two-level storage system can be prevented.

Also, through variable memory allocation of the non-volatile memory 100, efficient use of memory may be achieved.

Furthermore, by implementing the non-volatile memory 100 to be suitable to correspond to a one-level storage system, page faults may be prevented in response to pages being loaded, which contributes to improvement of system performance.

Figure 4:
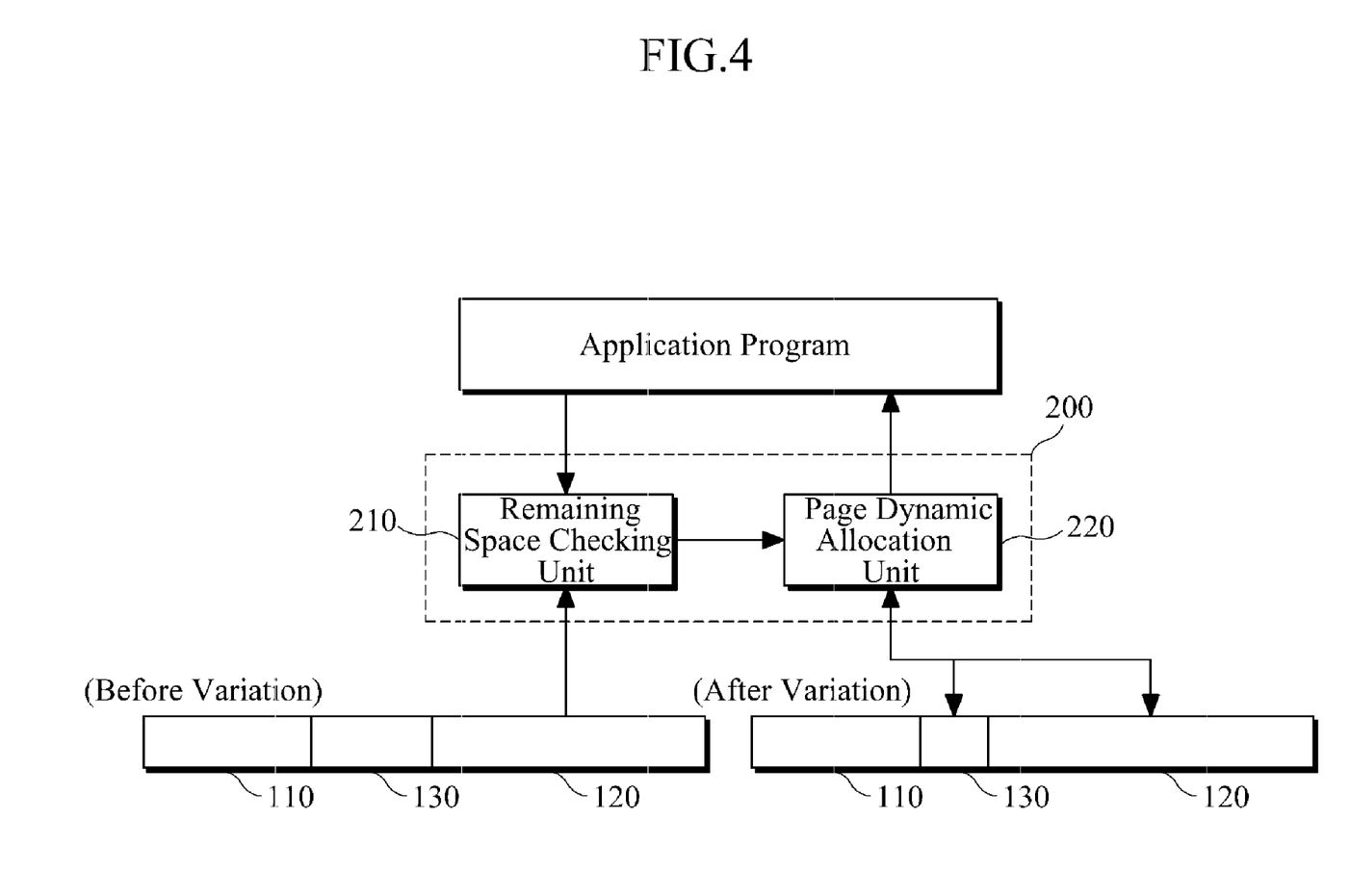
FIG. 4 is a diagram illustrating an exemplary page dynamic allocation apparatus of a non-volatile memory.

FIG. 4 illustrates an exemplary page dynamic allocation apparatus 200 of the non-volatile memory 100. As illustrated in FIG. 4, the page dynamic allocation apparatus 200 includes a remaining space checking unit 210 and a page dynamic allocation unit 220.

The remaining space checking unit 210 checks whether enough space to perform page allocation remains in the first variable region 120 of the non-volatile memory 100, according to a page allocation call request from an application program.

If the remaining space checking unit 210 determines that there is not enough space to perform page allocation, the page dynamic allocation unit 220 varies the size of the second variable region 130 to obtain the space needed from the second variable region 130, adds the obtained space to the first variable region 120 and then allocates pages to the first variable region 120 in correspondence to the page allocation call request.

Accordingly, the page dynamic allocation apparatus 200 performs variable memory allocation of the non-volatile memory 100, thereby making efficient use of memory.

Figure 5:
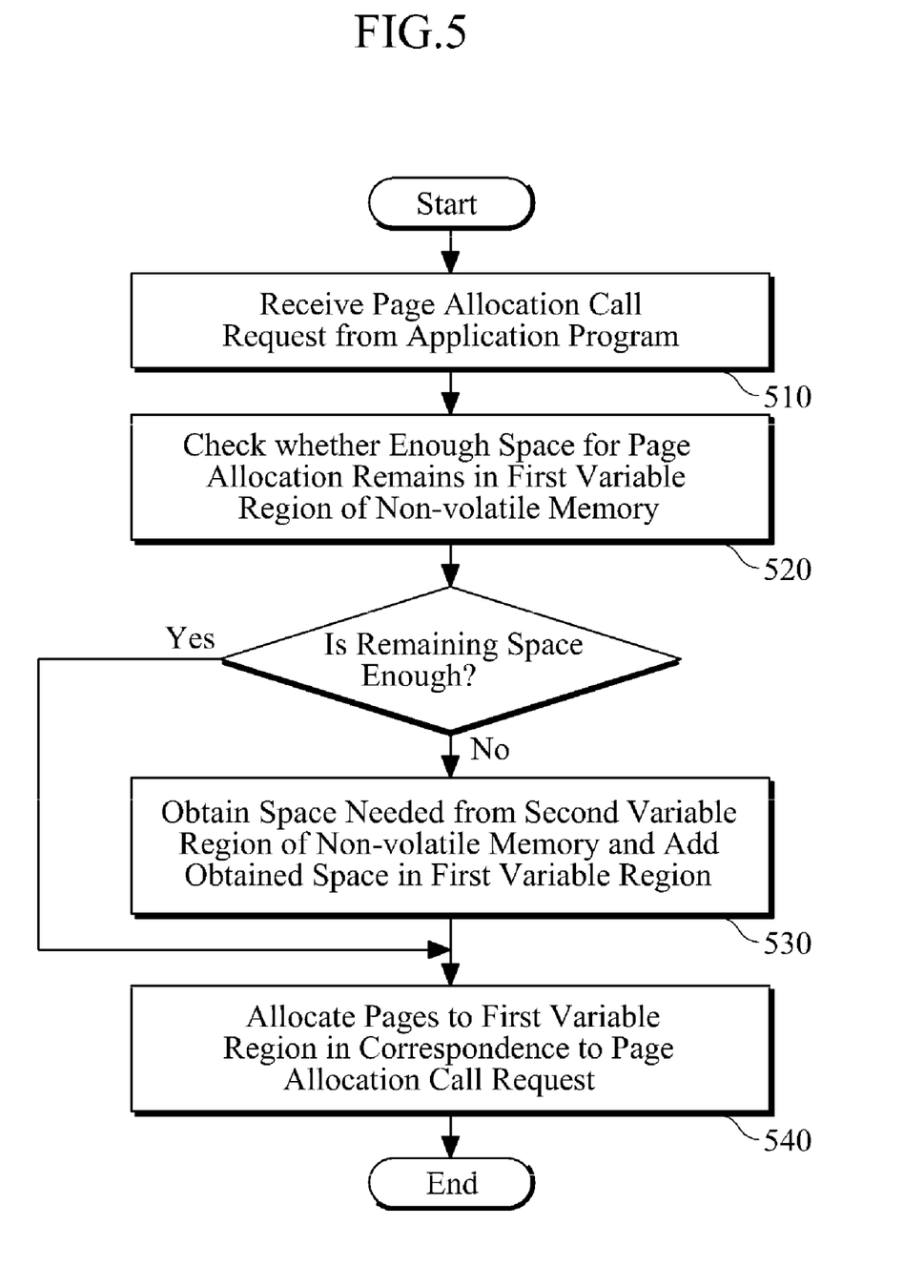
FIG. 5 is a flowchart illustrating an exemplary method of dynamically allocating pages in a non-volatile memory.

The following is a description of a page dynamic allocation method of the page dynamic allocation apparatus 200, with reference to FIG. 5. More specifically, FIG. 5 illustrates an exemplary method of dynamically allocating pages in the non-volatile memory 100.

Referring to FIGS. 1, 4 and 5, the page dynamic allocation apparatus 200 of the non-volatile memory 100 receives a page allocation call request from an application program (in 510).

The page dynamic allocation apparatus 200 checks whether enough space corresponding with page allocation remains in the first variable region 120 of the non-volatile memory 100 (in 520).

In response to a determination in 520 that not enough space exists in the first variable region 120 to perform page allocation, the page dynamic allocation apparatus 200 varies the size of the second variable region 130 to obtain the space needed from the second variable region 130 and adds the obtained space to the first variable region 120 (in 530).

Then, the page dynamic allocation apparatus 200 allocates pages to the first variable region 120 in correspondence to the page allocation call request (in 540).

Meanwhile, if it is determined in 520 that enough space does exist in the first variable region 120 to perform page allocation, the page dynamic allocation unit 200 allocates pages to the first variable region 120 in correspondence to the page allocation call request.

Accordingly, through variable memory allocation of the non-volatile memory 100, efficient use of memory may be achieved.

Figure 6:
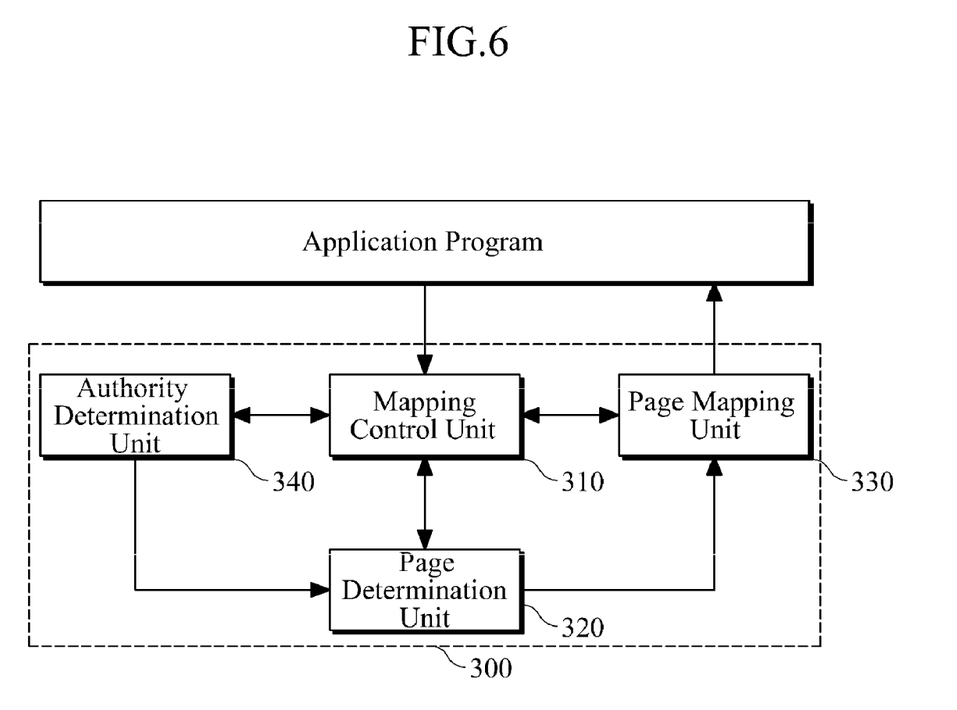
FIG. 6 is a diagram illustrating an exemplary page mapping apparatus of a non-volatile memory.

FIG. 6 illustrates an exemplary page mapping apparatus 300 of the non-volatile memory 100. The page mapping apparatus 300 includes a mapping controller 310, a page determiner 320 and a page mapping unit 330.

The mapping controller 310 performs page mapping control corresponding to pages in the non-volatile memory 100, in response to a page mapping call request from an application program.

The page determiner 320 determines a number of pages that are to be mapped, and reports physical addresses of the pages to be mapped to the mapping controller 310. At this time, the page determiner 320 may determine the number of pages that are to be mapped based on a page access pattern.

For example, the page determiner 320 determines the number of pages that are to be mapped based on locality of pages that have been accessed previously. That is, the page determiner 320 may determine the number of pages that are to be mapped based on how many pages have been accessed at certain specific locations.

Meanwhile, the page determiner 320 may determine the number of pages that are to be mapped according to a capacity of a page table of the application program which has issued the page mapping call request. That is, the page determiner 320 may prevent a page having a capacity greater than that of the page table of the application program from being called.

The page mapping unit 330 maps the determined pages to the page table of the application program which has issued the page mapping call request, according to the physical addresses of the determined pages.

Accordingly, by mapping pages stored at physically fixed addresses in the non-volatile memory 100 with the one-level storage structure to a page table of an application program which has issued a page mapping call request, page fault overhead can be greatly reduced.

That is, in the case of the conventional two-level storage, since the actual addresses of called pages cannot be recognized until the actual physical addresses of the pages are accessed by using virtual addresses, page fault overhead may be severe. However, in the exemplary embodiment, by mapping pages with fixed addresses in the non-volatile memory 100 with the one-level storage structure to a page table, page fault overhead can be greatly reduced, which contributes to improvement of system performance.

Meanwhile, according to another exemplary aspect, the page mapping apparatus 300 may further include an authority determination unit 340. The authority determination unit 340 determines whether the application program which has issued the page mapping call request includes access authority corresponding to the pages.

The authority determination unit 340 may determine access authority by determining whether a process which is designed to have pages is permitted to have the pages.

In response to the authority determination unit 340 determining that the application program has access authority corresponding to the pages, the mapping controller 310 performs page mapping control. That is, by determining through the authority determination unit 340 whether an application program has access authority corresponding to pages which it calls and by performing page mapping only when the application program has access authority corresponding to the pages, efficient page mapping may be achieved.

Figure 7:
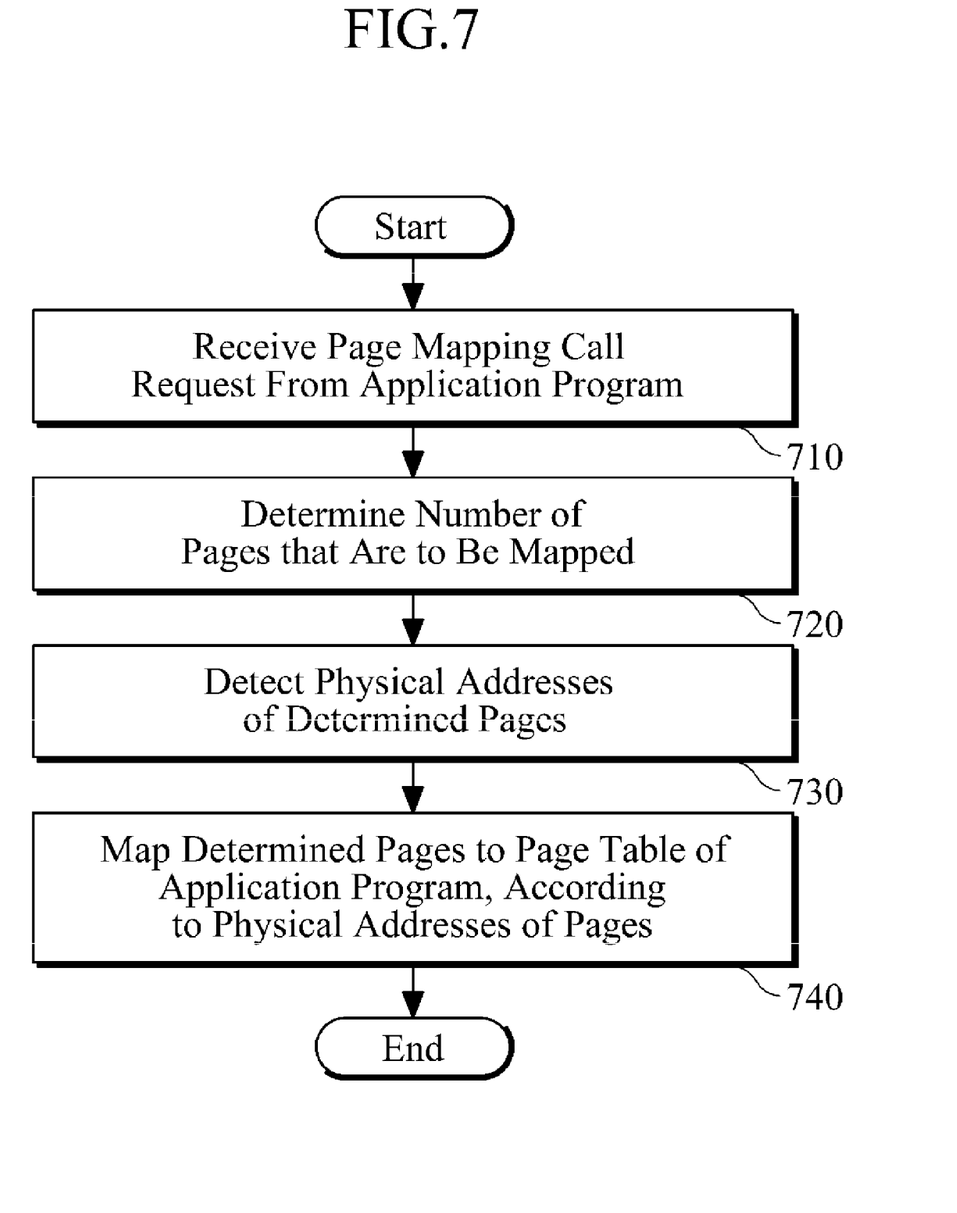
FIG. 7 is a flowchart illustrating an exemplary method of mapping pages in a non-volatile memory.

Hereinafter, a page mapping method of the page mapping apparatus 300 of the non-volatile memory 100 will be described with reference to FIG. 7. More specifically, FIG. 7 illustrates an exemplary method of mapping pages in the non-volatile memory 100.

First, the page mapping apparatus 300 receives a page mapping call request from an application program (in 710).

Then, the page mapping apparatus 300 determines the number of pages that are to be mapped (in 720).

In 720, the page mapping apparatus 300 may determine whether the application program which has issued the page call request has access authority corresponding to the pages, and determine the number of pages that are to be mapped where it is determined that the application program has access authority corresponding to the pages.

For example, the page mapping apparatus may determine whether the application program has access authority corresponding to the pages by determining whether the pages to be mapped according to the page mapping call request are occupied by another application program.

That is, in 720, by checking access authority corresponding to the pages to be mapped and performing page mapping only when the application program has access authority, efficient page mapping may be achieved.

The page mapping apparatus 300 may determine the number of pages that are to be mapped based on a page access pattern. For example, the page mapping apparatus 300 may determine the number of pages that are to be mapped based on locality of pages that have been accessed previously. That is, this means that the number of pages that are to be mapped is determined according to how many pages have been accessed at certain locations.

Meanwhile, in 720, the page mapping apparatus 300 may determine the number of pages that are to be mapped according to the capacity of a page table of the application program which has issued the page mapping call request. In this case, the page mapping apparatus 300 prevents a page having a capacity greater than that of the page table of the application program from being called.

If the number of pages that are to be mapped is determined in 720, the page mapping apparatus 300 detects the physical addresses of the determined pages (in 730).

Subsequently, the page mapping apparatus 300 maps the pages to a page table of the application program which has issued the page mapping call request, according to the physical addresses of the pages (in 740).

Accordingly, in this way, by mapping pages stored at physically fixed addresses in the non-volatile memory 100 with the one-level storage structure to a page table of an application program which has issued a page mapping call request, page fault overhead can be greatly reduced.

That is, in the case of the conventional two-level storage structure, since the actual addresses of called pages cannot be recognized until the physical actual addresses of the pages are accessed by using virtual addresses, page fault overhead may be severe. However, in the exemplary embodiment, by mapping pages with fixed addresses in the non-volatile memory 100 with the one-level storage structure to a page table, page fault overhead can be greatly reduced, which contributes to improvement of system performance.

According to exemplary embodiments described above, by proposing a non-volatile memory structure compatible a one-level storage system, fragmentation and page faults that may occur in a two-level storage system can be prevented.

Also, through variable memory allocation of a non-volatile memory compatible with a one-level storage system, efficient use of memory may be achieved.

Furthermore, page faults may be minimized in response to pages being loaded through page mapping of the non-volatile memory, which contributes to improved memory performance.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

Flash memory devices and/or memory controllers may be included in various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

Flash memory devices and/or the memory controllers may constitute memory cards. In this case, the memory controllers may be constructed to communicate with an external device for example, a host using any one of various types of interface protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

Flash memory devices may be non-volatile memory devices that can maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a DVD, a router, and a Global Positioning System (GPS).

A number of example exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A non-volatile memory, comprising:
a fixed-size region to store an operating system (OS) and pages used by the OS;
a first variable-size region to store application programs and pages used by the application programs, wherein the pages, which have physically-fixed addresses in the first variable-size region, are mapped to page tables; and
a second variable-size region to store read-only pages, wherein the size of the second variable region increases or decreases in correspondence to a variation in the size of the first variable region, wherein
the read-only pages stored in the second variable region are duplicated from and synchronized with original pages or synchronized with data stored in a hard disk drive, so as to more quickly access the OS.

2. The non-volatile memory of claim 1, wherein in the first variable region, pages sharing a common attribute corresponding to each application program are divided in units of a page size representable by the OS, and are positioned in successive spaces corresponding to each segment.

3. The non-volatile memory of claim 1, wherein the first variable region includes a metadata area to store physical start address information and size information of pages associated with each application program.

4. An apparatus to dynamically allocate pages in a non-volatile memory, the non-volatile memory including a fixed region to store an operating system (OS) and pages used by the OS, a first variable region to store application programs and pages used by the application programs, and a second variable region to store duplicated pages, wherein the size of the second variable region increases or decreases in correspondence to a variation in size of the first variable region, the apparatus comprising:
a remaining space checking unit to check whether enough space to perform page allocation remains in the first variable region, according to a page allocation call request from an application program; and
a page dynamic allocation unit to obtain space needed from the second variable region of the non-volatile memory when there is not enough space to perform the page allocation in the first variable region, to add the obtained space to the first variable region and to allocate the pages to the first variable region in correspondence to the page allocation call request, wherein
the duplicated pages stored in the second variable region are duplicated from and synchronized with original pages or synchronized with data stored in a hard disk drive, so as to more quickly access the OS.

5. An apparatus to map pages in a non-volatile memory, the apparatus comprising:

a mapping controller to perform page mapping control corresponding to pages stored in the non-volatile memory according to a page mapping call request from an application program;

a page determining unit to determine a number of pages to be mapped and report physical addresses of the pages to be mapped to the mapping controller; and a page mapping unit to map the pages to a page table of the application program which has issued the page mapping call request, according to the physical addresses of the pages, wherein the pages stored in the non-volatile memory are duplicated from and synchronized with original pages or synchronized with data stored in a hard disk drive, so as to more quickly access an operating system.

6. The apparatus of claim 5, further comprising:

an authority determination unit to determine whether the application program which has issued the page mapping call request has access authority corresponding to the pages.

7. The apparatus of claim 6, wherein in response the authority determination unit determining that the application program has access authority corresponding to the pages, the mapping controller performs the page mapping control corresponding to the pages.

8. The apparatus of claim 6, wherein the authority determination unit determines access authority by determining whether a process which is designed to have pages is permitted to have the pages.

9. The apparatus of claim 5, wherein the page determining unit determines the number of pages to be mapped based on a page access pattern.

10. The apparatus of claim 9, wherein the page determining unit determines the number of pages to be mapped based on the locality of pages that have been accessed previously.

11. The apparatus of claim 5, wherein the page determining unit determines the number of pages to be mapped according to the capacity of the page table of the application program which has issued the page mapping call request.

12. A method of allocating pages in a non-volatile memory, the non-volatile memory including a fixed-size region to store an operating system (OS) and pages used by the OS, a first variable region to store application programs and pages used by the application programs, and a second variable region to store duplicated pages, wherein the size of the second variable region increases or decreases in correspondence to a variation in the size of the first variable region, the method comprising:

receiving a page allocation call request from an application program;

checking whether enough space corresponding to page allocation remains in the first variable region, according to the page allocation call request;

in response to there not being enough space to perform page allocation in the first variable region, obtaining space needed from the second variable region of the non-volatile memory, and adding the obtained space to the first variable region; and allocating the pages to the first variable region in correspondence to the page allocation call request, wherein the duplicated pages stored in the second variable region are duplicated from and synchronized with original pages or synchronized with data stored in a hard disk drive, so as to more quickly access the OS.

13. A method of mapping pages in a non-volatile memory, comprising:

receiving a page mapping call request from an application program;

determining a number of pages to be mapped according to the page mapping call request;

detecting physical addresses of the pages to be mapped; and mapping the pages to a page table of the application program which has issued the page mapping call request, according to the physical addresses of the pages, wherein the pages stored in the non-volatile memory are duplicated from and synchronized with original pages or synchronized with data stored in a hard disk drive, so as to more quickly access an operating system.

14. The method of claim 13, wherein the determining of the number of pages to be mapped comprises:

determining whether the application program which has issued the page mapping call request has access authority for the pages; and determining the number of pages to be mapped if the application program has access authority corresponding to the pages.

15. The method of claim 14, wherein the determining of the number of pages to be mapped comprises:

determining whether the application program has access authority corresponding to the pages by determining whether the pages to be mapped are occupied by another application program.

16. The method of claim 13, wherein the determining of the number of pages to be mapped comprises:

determining the number of pages to be mapped based on a page access pattern.

17. The method of claim 16, wherein the determining of the number of pages to be mapped comprises:

determining the number of pages to be mapped based on the locality of pages that have been accessed previously.

18. The method of claim 13, wherein the determining of the number of pages to be mapped comprises:

determining the number of pages to be mapped according to the capacity of the page table of the application program which has issued the page mapping call request.

* * * * *